(12) United States Patent
Feilen (10) Patent No.: US 11,245,186 B2
(45) Date of Patent: Feb. 8, 2022

(54) SPATIAL AND BANDWIDTH MULTIPLEXING DEVICE AND METHOD

(71) Applicant: Rohde & Schwarz GmbH & Co. KG, Munich (DE)

(72) Inventor: Michael Feilen, Hoehenkirchen-Siegertsbrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 695 days.

(21) Appl. No.: 16/233,391

(22) Filed: Dec. 27, 2018

(65) Prior Publication Data

US 2020/0176868 A1    Jun. 4, 2020

(30) Foreign Application Priority Data

Nov. 29, 2018   (EP) .................................... 18209050

(51) Int. Cl.
*H01Q 3/40* (2006.01)
*H01Q 1/50* (2006.01)
*H01Q 3/24* (2006.01)
*H01Q 25/00* (2006.01)

(52) U.S. Cl.
CPC ................ *H01Q 3/40* (2013.01); *H01Q 1/50* (2013.01); *H01Q 3/247* (2013.01); *H01Q 25/002* (2013.01)

(58) Field of Classification Search
CPC ............ H01Q 3/40; H01Q 1/50; H01Q 3/247; H01Q 25/002; H04B 7/0689; H04B 7/0602; H04B 7/0871; H04B 7/0617; H04B 7/086
See application file for complete search history.

(56) References Cited

U.S. PATENT DOCUMENTS

| | | | | |
|---|---|---|---|---|
| 7,873,113 | B2* | 1/2011 | Takano | H04B 7/0874 375/267 |
| 2008/0232305 | A1* | 9/2008 | Oren | H04B 7/0602 370/328 |
| 2011/0033011 | A1* | 2/2011 | Chen | H04B 7/0854 375/298 |
| 2011/0111708 | A1* | 5/2011 | Tu | H04W 52/028 455/82 |
| 2018/0076869 | A1 | 3/2018 | Aue et al. | |
| 2018/0351605 | A1* | 12/2018 | Liang | H04B 7/0417 |

OTHER PUBLICATIONS

Uthansakul et al., Design and Performance Assessment of a Wideband Smart Antenna Employing Only Spatial Signal Processing, The University of Queensland, Brisbane, Qld, Australia (Year: 2006).*

* cited by examiner

*Primary Examiner* — Mounir Moutaouakil
(74) *Attorney, Agent, or Firm* — Potomac Technology Law, LLC (57) ABSTRACT

A device for transmitting and/or receiving electromagnetic signals includes an antenna array, a combiner/splitter unit, a signal processing unit, and a switch. The antenna array includes a plurality of N antenna elements adapted to transmit and/or receive electromagnetic signals. The signal processing unit comprises at least one analog-to-digital converter and/or digital-to-analog converter for each of the antenna elements of the antenna array. The switching unit is adapted to switch between a broadband mode and a spatial resolution mode.

13 Claims, 8 Drawing Sheets

SPATIAL AND BANDWIDTH MULTIPLEXING DEVICE AND METHOD

RELATED APPLICATIONS

This application claims priority from European Patent Application No. EP18209050.6 (filed 2018 Nov. 29), the entirety of which is incorporated by reference herein.

TECHNICAL FIELD

The invention relates to transmitting and/or receiving signals through an antenna array.

BACKGROUND

During recent years, the use of antenna arrays for transmitting and receiving electromagnetic signals has come to widespread use. A common application of an antenna array is beamforming, where phase differences of individual antenna elements of the antenna array are used to achieve a spatial resolution. For example, the US 2018/076869 A1 shows such a beamforming antenna array.

The individual transmission/reception paths of the individual antenna elements of such antenna arrays though have only a small bandwidth. This leads to a low bandwidth of the entire system. A reduced flexibility is the consequence.

Accordingly, there is a need to provide a device for transmitting and/or receiving electromagnetic signals with an increased flexibility. Moreover, there is a need to provide an according method.

SUMMARY

Embodiments of the present invention advantageously address the foregoing requirements and needs, as well as others, by providing a device and associated method for transmitting and receiving electromagnetic signals with increased flexibility.

An inventive device for transmitting and/or receiving electromagnetic signals comprises an antenna array, comprising a plurality of N antenna elements, adapted to transmit and/or receive electromagnetic signals, a combiner/splitter unit, a signal processing unit, comprising at least one analog-digital converter and/or digital-analog converter for each of the antenna elements of the antenna array, and a switching unit, adapted to switch between a broadband mode and a spatial resolution mode. This allows for a spatial resolution in spatial resolution mode and a high bandwidth in broadband mode.

Advantageously and preferably, the switching unit comprises a first switching unit and a second switching unit. The first switching unit is connected to the antenna array, the combiner/splitter unit and the second switching unit. The first switching unit is adapted to switch the antenna array between one of the combiner/splitter unit and the second switching unit. The second switching unit is connected to the combiner/splitter unit, the first switching unit and the signal processing unit. The second switching unit is then adapted to switch the signal processing unit between one of the combiner/splitter unit and the first switching unit. This allows for a very simple construction of the switching unit.

Further advantageously and preferably, in broadband mode, the first switching unit is adapted to connect the antenna array to the combiner/splitter unit and the second switching unit is adapted to connect the combiner/splitter unit to the signal processing unit. Additionally, or alternatively, in spatial resolution mode, the first switching unit is adapted to connect the antenna array to the second switching unit and the second switching unit is adapted to connect the first switching unit to the signal processing unit. This allows for a very simple implementation of the broadband mode and the spatial resolution mode.

Advantageously and preferably, the combiner/splitter unit comprises a plurality of N first ports and a plurality of N second ports. The combiner/splitter unit is adapted to combine input signals at the plurality of N first ports to a single output signal at the plurality of N second ports. Additionally, or alternatively, it is adapted to provide a single input signal present at the plurality of N second ports to the plurality of N first ports. This allows for a very simple signal combining and splitting.

Advantageously and preferably, the first switching unit comprises a plurality of N switches. The second switching unit also comprises a plurality of N switches. The signal processing unit moreover comprises a plurality of N signal paths. Each of the plurality of N switches of the first switching unit is then connected to one of the antenna elements of the antenna array, one of the plurality of N first ports of the combiner/splitter unit, and one of the plurality of N switches of the second switching unit. Each of the plurality of N switches of the second switching unit is connected to one of the plurality of N switches of the first switching unit, one of the plurality of N second ports of the combiner/splitter unit, and one of the plurality of N signal paths of the signal processing unit. This allows for a very simple construction of the switching units.

Advantageously and preferably, in broadband mode, the plurality of N switches of the first switching unit is adapted to connect the plurality of N antenna elements of the antenna array to the plurality of N first ports of the combiner/splitter unit. Moreover, in broadband mode, the plurality of N switches of the second switching unit is adapted to connect the plurality of N second ports of the combiner/splitter unit to the plurality of N signal paths of the signal processing unit. Additionally, or alternatively, in spatial resolution mode, the plurality of N switches of the first switching unit is adapted to connect the plurality of N antenna elements of the antenna array to the plurality of N switches of the second switching unit. Additionally, in this case, the plurality of N switches of the second switching unit is adapted to connect the plurality of N switches of the first switching unit to the plurality of N signal paths of the signal processing unit. This allows for an especially simple implementation of the broadband mode and the spatial resolution mode.

Advantageously and preferably, each of the plurality of N signal paths of the signal processing unit is adapted to, when the device is receiving an electromagnetic signal in broadband mode, process a reception of a different frequency slice of the received electromagnetic signal, and when the device is transmitting an electromagnetic signal in broadband mode, generate a different frequency slice of the electromagnetic signal to be transmitted. This allows for a very simple implementation of the broadband mode.

Alternatively and preferably, each of the plurality of N signal paths of the signal processing unit is adapted to, when the device is receiving an electromagnetic signal in spatial resolution mode, process a reception of a different antenna element reception signal, and when the device is transmitting an electromagnetic signal in spatial resolution mode, generate a different antenna element signal to be transmitted. This allows for a very simple implementation of the spatial resolution mode.

Advantageously and preferably, each signal path of the signal processing unit comprises a first mixer and/or a filter and/or the before-mentioned analog-digital converter and/or digital-analog converter for each of the antenna elements of the antenna array and/or an upsampler and/or a downsampler and/or a second mixer. This allows for a very simple implementation of further processing by the signal processing unit.

Advantageously and preferably, the device is a transceiver, adapted to transmit and receive electromagnetic signals. The plurality of N antenna elements is then adapted to transmit and receive electromagnetic signals. The combiner/splitter unit is then adapted to combine input signals at the plurality of N first ports to a single output signal at the plurality of N second ports and provide a single input signal present at plurality of N second ports to the plurality of N first ports. The signal processing unit is then adapted to generate signals to be transmitted by the antenna array and receive signals received by the antenna array as electromagnetic signals.

This allows for an especially flexible use of the device. Alternatively, the device is only a receiver, adapted to receive electromagnetic signals. The plurality of N antenna elements is then adapted to receive electromagnetic signals. The combiner/splitter unit is then adapted to combine input signals at the plurality of N first ports to a single output signal at the plurality of N second ports. The signal processing unit is then adapted to receive signals received by the antenna array as electromagnetic signals. This allows for a reduction of complexity and comparison to the transceiver.

Alternatively and preferably, the device is merely a transmitter, adapted to transmit electromagnetic signals. The plurality of N antenna elements is then adapted to transmit electromagnetic signals. The combiner/splitter unit is then adapted to provide a single input signal present at the plurality of N second ports to the plurality of N first ports. The signal processing unit is then adapted to generate signals to be transmitted by the antenna array. This allows for a reduction of complexity with regard to the transceiver.

Advantageously and preferably, N is at least 2, or at least 3, or at least 4, or at least 5, or at least 6, or at least 7, or at least 8, or at least 9, or at least 10, or at least 16, or at least 32, or at least 64, or at least 128, or at least 256, or at least 512, or at least 1024. This allows for a very flexible use of the antenna array.

An inventive method for transmitting and receiving electromagnetic signals comprises selecting one of a broadband mode and a spatial resolution mode, setting a switching unit to a specific setting for the selected mode, routing received signals and/or signals to be transmitted on a signal path from an antenna array comprising a plurality of N antenna elements, to a signal processing unit, in spatial resolution mode, and routing received signals and/or signals to be transmitted on a signal path from the antenna array to a combiner/splitter unit, to the signal processing unit, in broadband mode. This allows for a spatial resolution in spatial resolution mode and a high bandwidth in broadband mode.

An inventive computer program comprises program code for performing the previously described method, when the computer program runs on a computer or a digital signal processor. This allows for a spatial resolution in spatial resolution mode and a high bandwidth in broadband mode.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

An exemplary embodiment of the invention is now further explained with respect to the drawings by way of examples only, in which.

DETAILED DESCRIPTION

A device and associated method for transmitting and receiving electromagnetic signals with increased flexibility are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
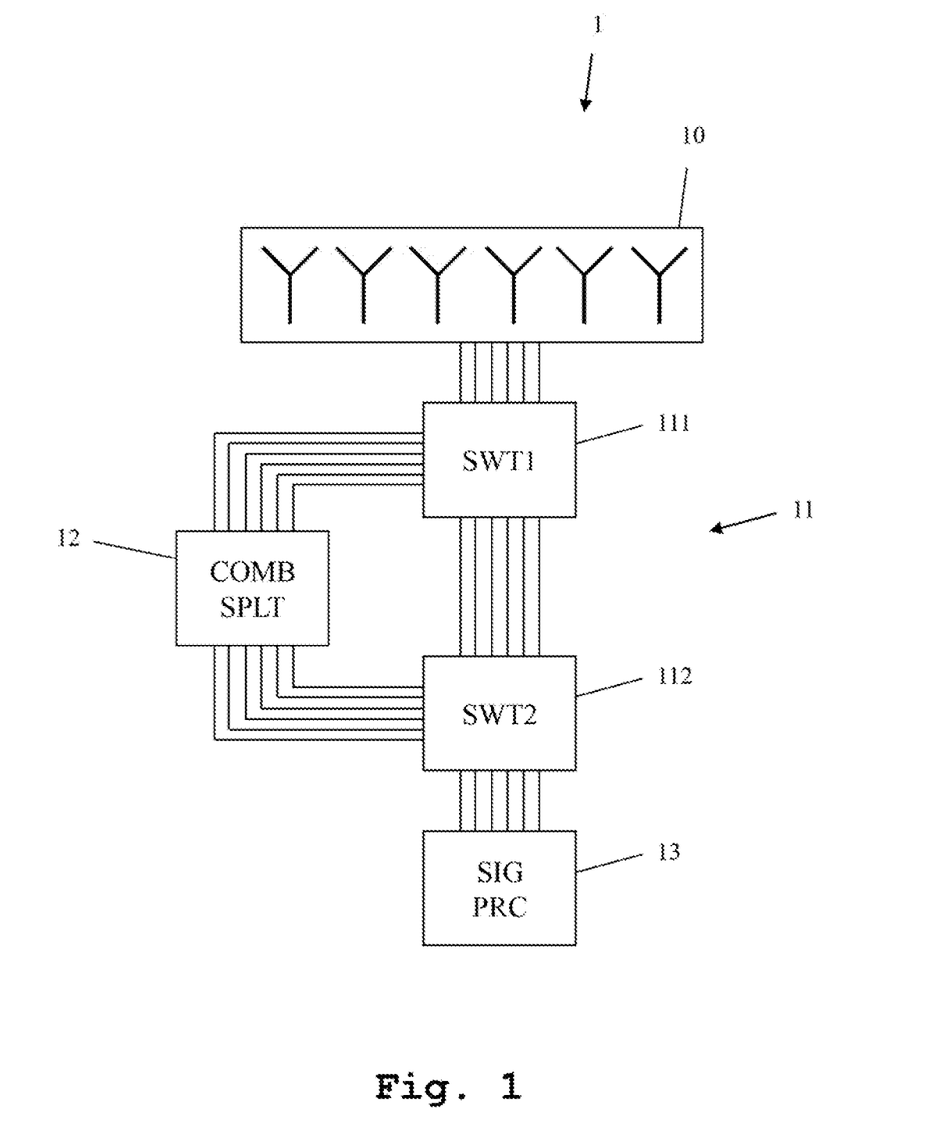
FIG. 1 shows a first embodiment of the inventive device in a block diagram.
Figure 2:
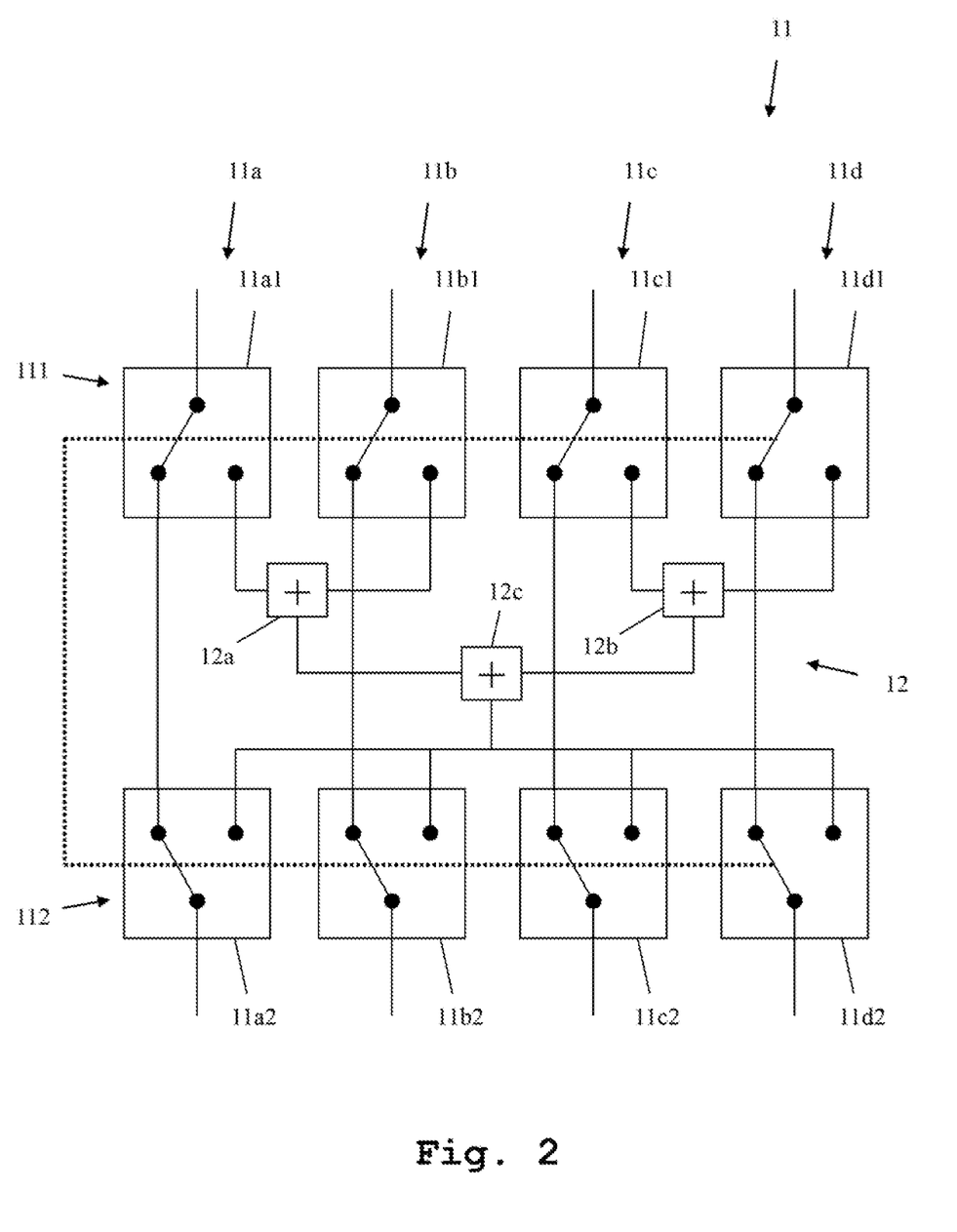
FIG. 2 shows a detail of a second embodiment of the inventive device in a block diagram.
Figure 3:
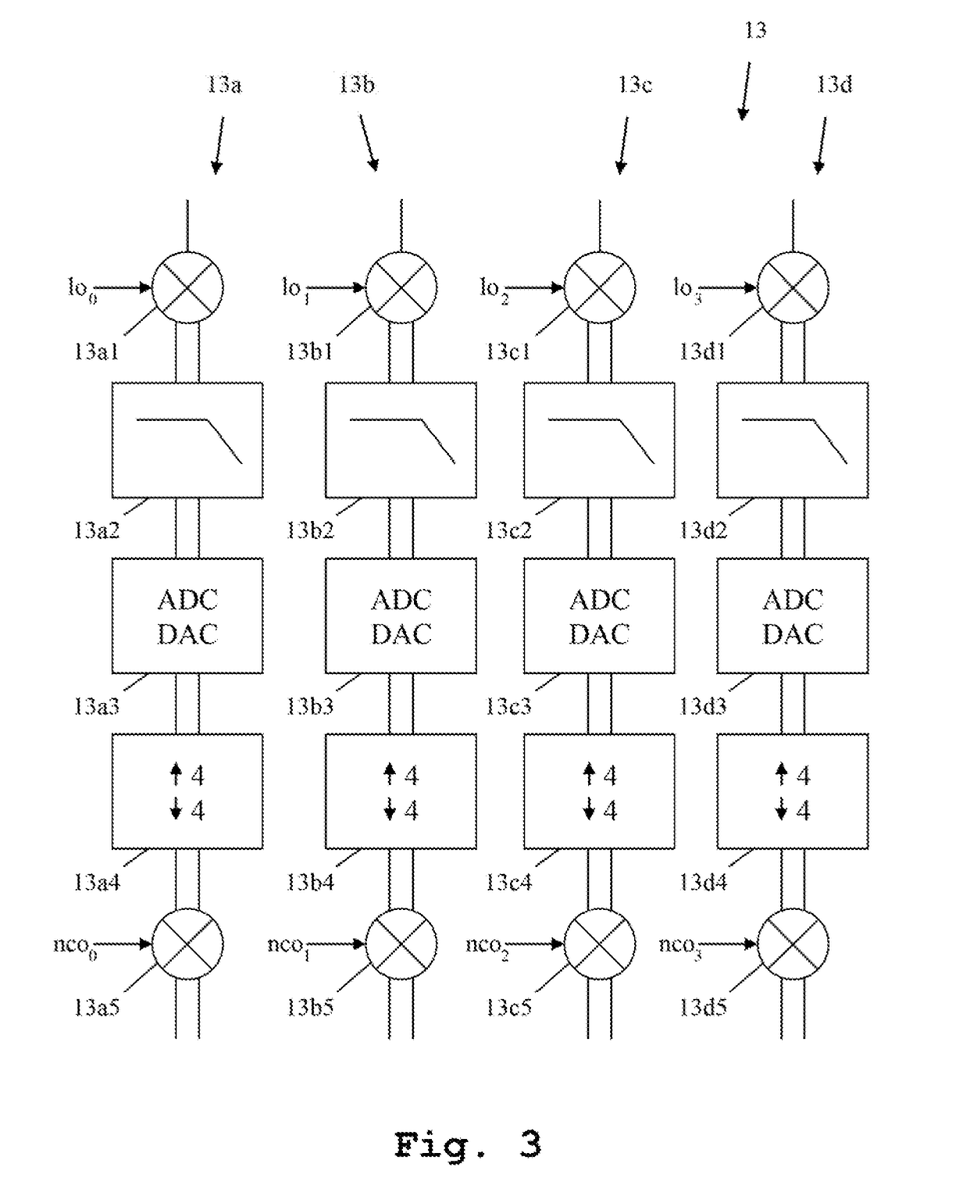
FIG. 3 shows a detail of a third embodiment of the inventive device in a block diagram.

First, we demonstrate the general function and construction of different embodiments of the inventive device along FIG. 1-FIG. 3. With regard to FIG. 4-FIG. 7, further details of the operation of different embodiments of the inventive device are shown. Finally, along FIG. 8, the function of an embodiment of the inventive method is described in detail. Similar entities and reference numbers in different figures have been partially omitted.

In FIG. 1, a first embodiment of the inventive device 1 is shown. The inventive device 1 may either be a transceiver, or a receiver, or a transmitter.

The device 1 comprises an antenna array 10, which is connected to a switching unit 11, which again is connected to a combiner/splitter unit 12 and a signal processing unit 13. Especially, the switching unit 11 may be comprised by a first switching unit 111 and a second switching unit 112. The antenna array 10 therein comprises a plurality of individual antenna arrays. Plurality is to be understood as at least two antenna elements.

In detail, the antenna array 10 is connected to the first switching unit 111, which is further connected to the combiner/splitter unit 12 and the second switching unit 112. The second switching unit 112 is also connected to the combiner/splitter unit 12 and to the signal processing unit 13.

The connections between the different units 10-13 are fashioned so that individual channels corresponding to the antenna elements of the antenna array 10 are retained. This means that the antenna array 10 is connected to the first switching unit 111 by a number N of lines corresponding to the number N of antenna elements of the antenna array 10. The first switching unit 111 is connected to the combiner/splitter unit 12 also with N lines. The first switching unit 111 is connected to the second switching unit 112 also by a number N of lines. Further, the combiner/splitter unit 12 is connected to the second switching unit 112 by N lines. Also, the second switching unit 112 is connected to the signal processing unit 13 by N lines.

The antenna array 10 can additionally comprise phase shifters, for introducing an individual phase shift of the antenna elements. Alternatively, this phase shift can be introduced in the signal processing unit 13.

The device 1 can be configured into different modes: A broadband mode and a spatial resolution mode.

In broadband mode, the antenna array 10 is connected to the signal processing unit 13 via the combiner/splitter unit 12 by the switching unit 11. In detail, this is done by the first switching unit 111 connecting the antenna array 10 to the combiner/splitter unit 12 and the second switching unit 112 connecting the combiner/splitter unit 12 to the signal processor unit 13.

In spatial resolution mode, the antenna array 10 is directly connected to the signal processing unit 13 by the switching unit 11. In detail, this is done by the first switching unit 111 connecting the antenna array 10 to the second switching unit 112, and the second switching unit 112 connecting the first switching unit 111 to the signal processing unit 13. This means that in spatial resolution mode, the combiner/splitter unit 12 is not connected to the signal path.

Therefore, when receiving a signal in broadband mode, all antenna elements of the antenna array 10 receive a similar signal, since the antenna array 10 does not introduce a phase shift, as used to achieve a spatial resolution. The individual antenna element signals are routed to the combiner/splitter unit 12 by the first switching unit 111. The combiner/splitter unit 12 combines the individual antenna element signals of the antenna array 10 and provides them to the second switching unit 112. It should be noted that the combiner/splitter unit 12 provides the output signal on the same number of output lines, as input lines. Therefore, the second switching unit 112 receives an identical combined signal on N lines. This signal is then routed by the second switching unit 112 to the signal processing unit 13, which processes the N identical signals. Especially, the signal processing unit 13 can process different frequency slices on the different channels, thereby achieving an especially high bandwidth.

When transmitting a signal in broadband mode, the signal processing unit 13 provides a plurality of N individual transmission signals, which can for example be N different frequency slices of a signal to be transmitted. These individual signals to be transmitted are routed by the second switching unit 112 to the combiner/splitter unit 12, which then combines them to a single signal to be transmitted. This single signal then is again split to N identical output signals, which are routed by the first switching unit 111 to the individual antenna elements of the antenna array 10. The individual antenna elements then emit the electromagnetic signal.

When receiving a signal in spatial resolution mode, each antenna element of the antenna array 10 receives an individual signal. Especially for this case, the antenna array can comprise a phase shifter for each of the antenna elements. The individual received antenna element signals are routed by the first switching unit 111 to the second switching unit 112, which routes them directly to the signal processor 13, circumventing the combiner/splitter unit 12. The signal processor unit 13 then individually processes the individual antenna element reception signals, retaining the spatial resolution information.

When transmitting a signal in spatial resolution mode, the signal processing unit 13 provides a plurality of N individual signals to be transmitted. The individual signals to be transmitted can already be provided by the signal processing unit 13 with a phase shift in order to achieve a spatial resolution, e.g. a beamforming. The resulting individual signals to be transmitted are handed to the second switching unit 112 which routes them to the first switching unit 111, which again routes them to the individual antenna elements of the antenna array 10. In case the necessary phase shift for achieving the spatial resolution has not been introduced by the signal processing unit 13, it may be introduced by phase shifters within the antenna array 10. Further details of the switching unit 11 and the combiner/splitter unit 12 are shown along FIG. 2 and FIG. 3.

In FIG. 2, a detailed block diagram of the switching unit 11 and the combiner/splitter unit 12 are shown. The switching unit 11 comprises a first switching unit 111 and a second switching unit 112. In FIG. 2, a case of N=4 is shown. This means that the antenna array 10 shown in FIG. 1 comprises four antenna elements, which are connected to four individual switches 11$a$1, 11$b$1, 11$c$1 and 11$d$1 of the first switching unit 111. This forms four signal paths 11$a$, 11$b$, 11$c$ and 11$d$. The first switches 11$a$1-11$d$1 are connected to second switches 11$a$2, 11$b$2, 11$c$2, 11$d$2 of the second switching unit 112 through a dedicated line, each. Moreover, the first switches 11$a$1-11$d$1 are connected to the combiner/splitter unit 12, which again is connected to the second switches 11$a$2-11$d$2.

The first switches 11$a$1-11$d$1 as well as the second switches 11$a$2-11$d$2 all may switch at the same time. This means that all switches are either in the position shown here in FIG. 2 or in the position shown in FIG. 6.

In the embodiment shown here, the combiner/splitter unit 12 consists of three Wilkinson combiners 12a, 12b and 12c. The Wilkinson combiner 12a combines the signal of the switches 11a1 and 11b1 and routes the resulting signal to the Wilkinson combiner 12c. The Wilkinson combiner 12b combines the signals of the switches 11c1 and 11d1 and routes a resulting signal to the Wilkinson combiner 12c. The Wilkinson combiner 12c combines the signals, which are then split to the second switches 11a2-11d2. It is important to note that the specific construction of the combiner/splitter unit 12 is not to be understood as fixed. Also, a different structure of combiners and splitters can be used. It is preferred that signals provided on the side of the second switches 11a2-11d2 are combined and provided as an identical signal to all of the first switches 11a1-11d1, and that signals provided on the side of the first switches 11a1-11d1 are combined and provided as identical signals to each of the second switches 11a2-11d2.

In a first switch setting, as shown here, the combiner/splitter unit 12 is not connected to the signal paths 11a-11d. This corresponds to the spatial resolution mode, as described earlier.

In FIG. 3, a detail of a further embodiment of the inventive device 1 is shown. Especially here, a detail of the signal processing unit 13 is shown. The signal processing unit 13 comprises four individual signal paths 13a, 13b, 13c and 13d, which are all constructed identically. Also, here, the case of N=4 corresponding to four antenna elements of the antenna array 10 of FIG. 1 is shown.

The signal paths 13a-13d each comprise a first mixer 13a1, 13b1, 13c1 and 13d1, connected to the switching unit 12. Connected to the first mixers is a filter 13a2, 13b2, 13c2, 13d2 in each signal path 13a-13d. Connected to the filters 13a2-13d2 are analog-digital converters and/or digital-analog converters 13a3, 13b3, 13c3, 13d3. Connected to these are upsamplers/downsamplers 13a4, 13b4, 13c4, 13d4. Connected to these are second mixers 13a5, 13b5, 13c5, 13d5.

It is worth to be noted that the signal processing unit 13 does not necessarily have to comprise all of the units displayed here. In a most simple construction, the signal processing unit 13 merely comprises an analog-digital converter/digital-analog converter for each of the signal paths 13a-13d. In the following though, the embodiment as displayed in FIG. 3 is described in greater detail.

Dependent upon the operation mode, the first mixers 13a1-13d1 and the second mixers 13a5-13d5 are provided with different signals.

When receiving a signal in broadband mode, identical signals are provided by the switching unit 12 to the signal paths 13a-13d. These signals are mixed with local oscillator signals $Io_0$, $Io_1$, $Io_2$ and $Io_3$ by the first mixers 13a1-13d1. In this embodiment, the first mixers 13a1-13d1 are I/Q-mixers, thereby resulting in a I-output signal and a Q-output signal, each. The resulting I/Q signals are handed to the filters 13a2-13d2, which perform a filtering, to limit the bandwidth of the individual signal. The resulting I/Q signals are handed to the analog-digital converters and/or digital-analog converters 13a3-13d3, which digitize the analog signals using a sampling frequency $f_s$. The resulting digital I/Q signals are handed to the upsamplers/downsamplers 13a4-13d4, which increase the sampling rate, for example by the factor 4. The resulting digital upsampled I/Q signals are handed to the second mixers 13a5-13d5, which perform an additional mixing with signals $nco_0$, $nco_1$, $nco_2$ and $nco_3$.

The signals provided to the first mixers 13a1-13d1 are given as follows:

$$I_{0_0} = e^{j(f_0+0\cdot\frac{fs}{2})t}$$

$$I_{0_1} = e^{j(f_0+1\cdot\frac{fs}{2})t}$$

$$I_{0_2} = e^{j(f_0+2\cdot\frac{fs}{2})t}$$

$$I_{0_3} = e^{j(f_0+3\cdot\frac{fs}{2})t}$$

Figure 5:
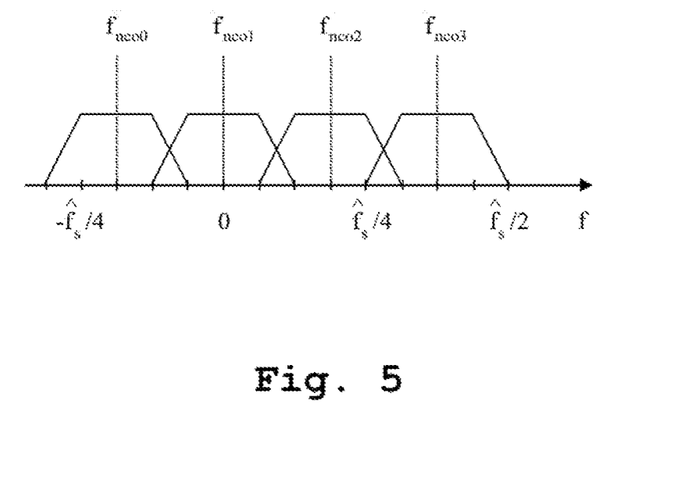
FIG. 5 shows exemplary signals within a fifth embodiment of the inventive device.

The frequencies of the signals provided to the second mixers 13a5-13d5 are given as follows:

$f_{NCO_0} = -3/4 \hat{f}_s$ $f_{NCO_1} = 0$ $f_{NCO_2} = 3/4 \hat{f}_s$ $f_{NCO_3} = 3/2 \hat{f}_s$ Therein, $\hat{f}_s = 4f_s$ This frequency constellation can also be seen in FIG. 5.

The resulting digital I/Q signals after the mixing are therefore frequency shifted achieving a high bandwidth of reception.

When transmitting a signal in broadband mode, the reverse direction is followed. Digital I/Q signals, which each cover a specific different frequency slice of a combined output signal, are provided to the second mixers 13a5-13d5, which mix them with the signals $nco_0$-$nco_3$ achieving the desired frequency shift, so that the output signals form a high bandwidth combined output signal. The signals are then provided to the upsamplers/downsamplers 13a4-13d4, which perform a downsampling, for example with the factor 4. The resulting downsampled signals are handed to the analog-digital converters and/or digital-analog converters 13a3-13d3, which generate analog signals from the digital signals. These are filtered by the filters 13a2-13d2 and again mixed with the signals $Io_0$-$Io_3$, achieving frequency slice output signals, which are then routed through the combiner/splitter unit 12 to be transmitted by the antenna elements of the antenna array 10 as a combined output signal.

When receiving a signal in spatial resolution mode, the combiner/splitter unit 12 as described earlier is circumvented by the switching unit 11. The individual antenna element reception signals are directly handed to the signal path 13a-13d of the signal processing unit 13. Each of the signals is handled individually. Especially, the first mixers 13a1-13d1 perform a mixing with the signals $Io_0$-$Io_3$ after which a filtering by the filters 13a2-13d2 is performed. After digitization by the analog-digital converters and/or digital-analog converters 13a3-13d3, an upsampling, for example by a factor of 4 is performed by the upsamplers/downsamplers 13a4-13d4. Finally, a further mixing with the signals $nco_0$-$nco_3$ by the second mixers 13a5-13d5 is performed. The individual antenna element signals are processed within the same narrow bandwidth. By either introducing a phase shift within the antenna array 10 or by digitally introducing a phase shift, not shown here, the spatial resolution, e.g. beamforming is achieved.

When transmitting a signal in spatial resolution mode, individual digital I/Q signals to be transmitted are provided to the second mixers 13a5-13d5 and are mixed with the signals $nco_0$-$nco_3$. After a downsampling by the upsamplers/downsamplers 13a4-13d4, the signals are converted to analog signals by the analog-digital converters/digital-analog converters 13a3-13d3 and are then filtered by filters 13a2-13d2. After a final mixing with the signals $Io_0$-$Io_3$ by the mixers 13a1-13d1, the signals are handed to the switching unit 12, which routes them directly to the individual antenna elements of the antenna array 10 to be transmitted. Also, here, the phase shift necessary for achieving the spatial resolution is achieved by either providing the original signals to be transmitted already including the phase shift, or by introducing the phase shift using phase shifters within the antenna array 10.

Figure 4:
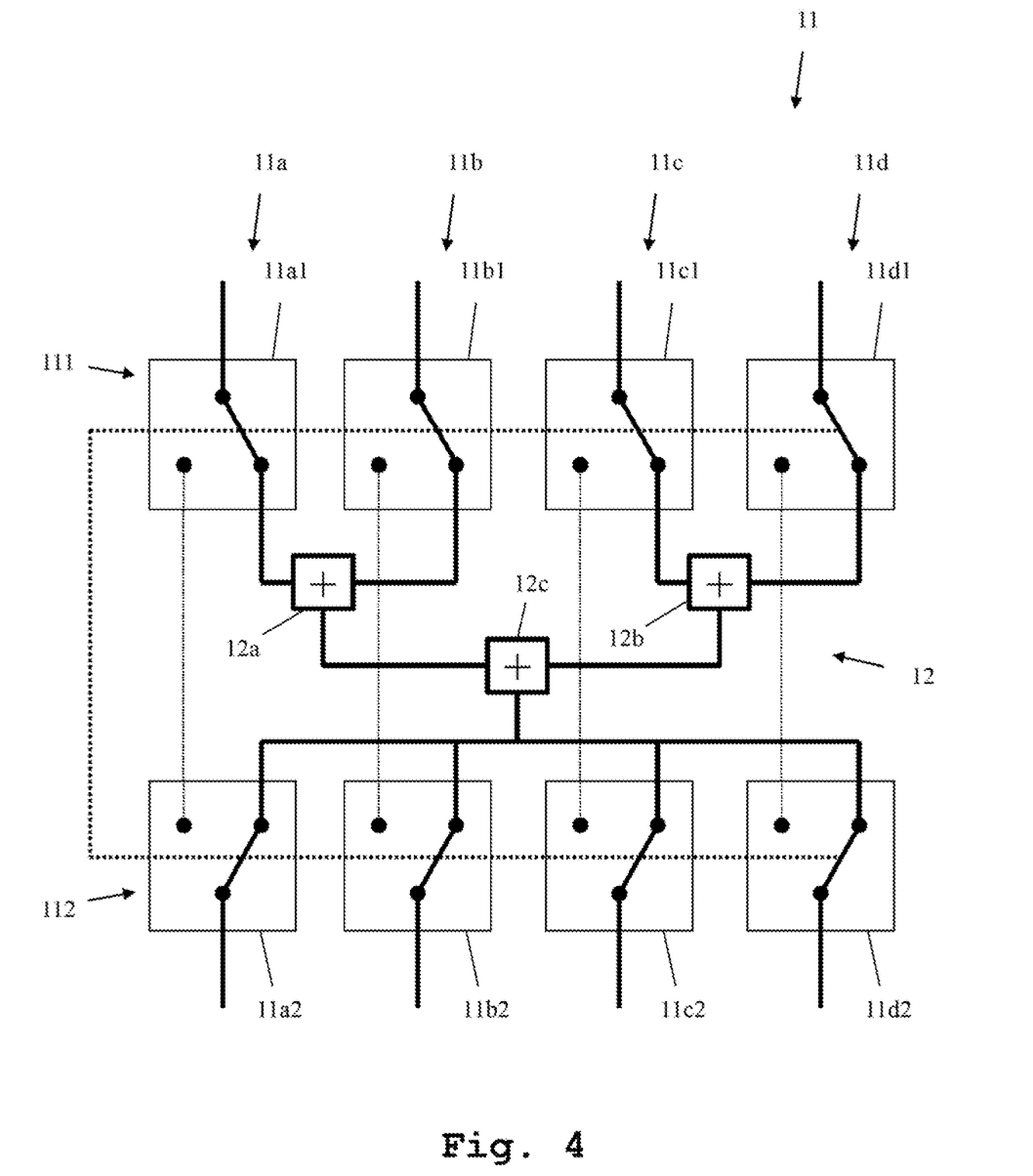
FIG. 4 shows one mode of operation of a fourth embodiment of the inventive device.

In FIG. 4, the same circuit diagram as in FIG. 2 is shown. Here, though, the active circuit elements in broadband mode are highlighted, while the passive circuit elements are shown as dashed lines. It can readily be seen that the combiner/splitter unit 12 is active in the broadband mode, shown here.

The resulting bandwidth of the individual partial signals can be seen in FIG. 5.

Figure 6:
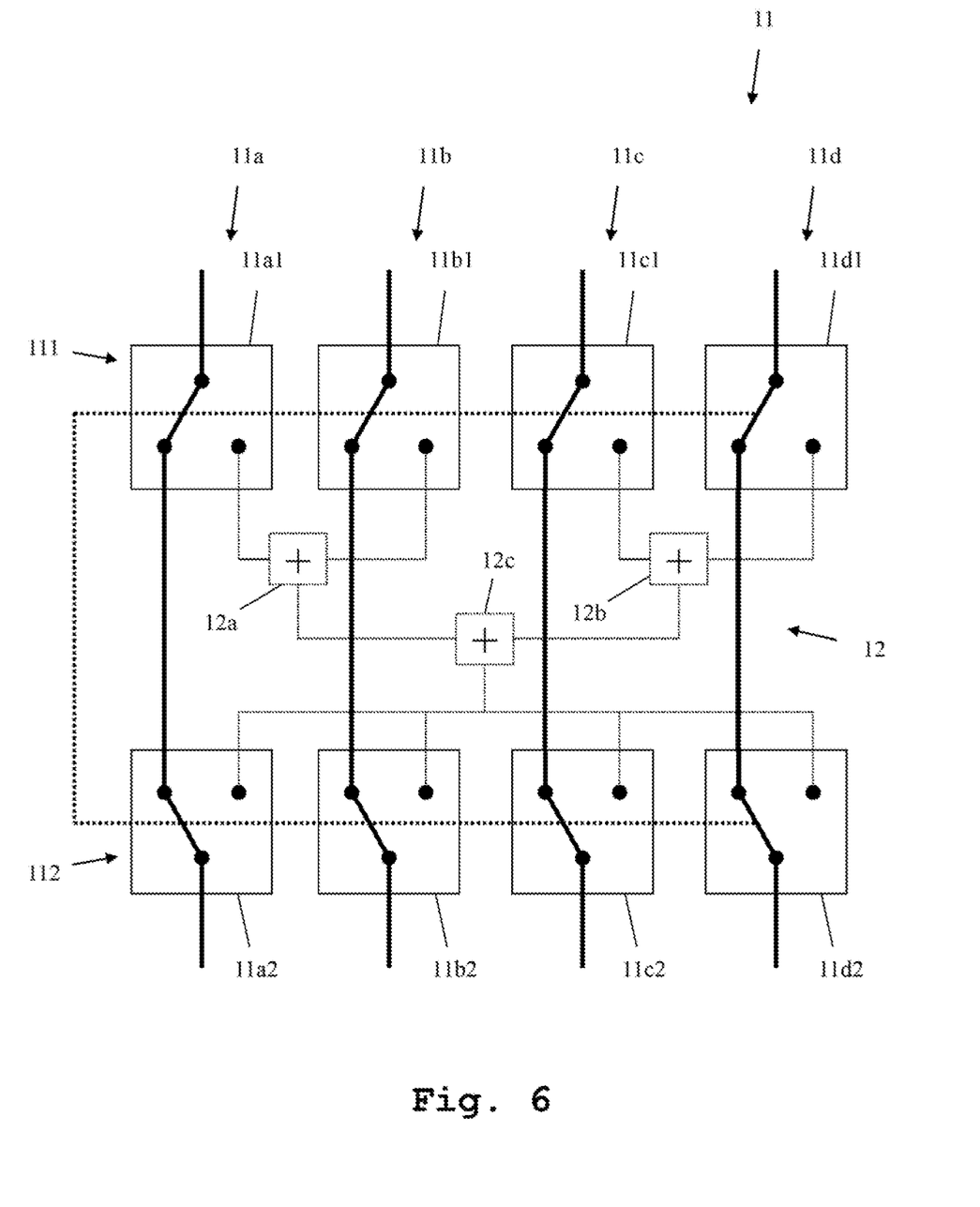
FIG. 6 shows a further mode of operation of a sixth embodiment of the inventive device.

Moreover, in FIG. 6, the active circuit elements in spatial resolution mode are highlighted while the passive circuit elements are shown as dashed lines. It can be readily seen that the switching unit 11 circumvents the combiner/splitter unit 12 in the signal paths 11a-11d.

Figure 7:
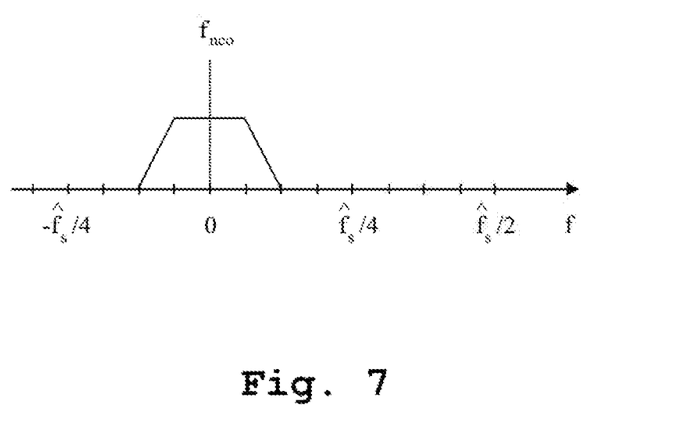
FIG. 7 shows an exemplary signal in a seventh embodiment of the inventive device.

The identical narrow bandwidth of the individual antenna element signals in spatial resolution mode is shown in FIG. 7.

Figure 8:
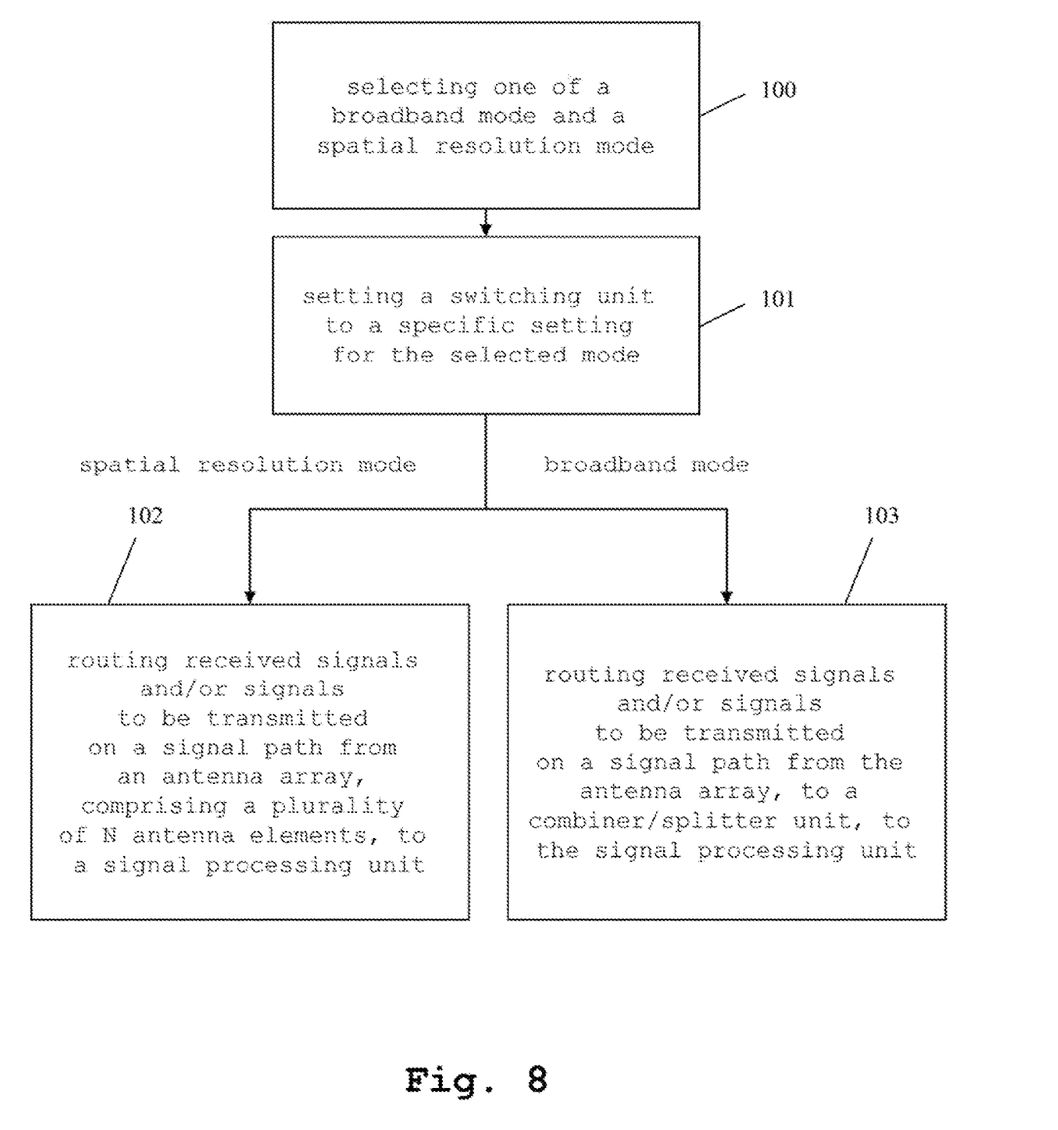
FIG. 8 shows an exemplary embodiment of the inventive method in a flow diagram.

Finally, in FIG. 8, an embodiment of the inventive method is shown in a flow diagram. In a first step 100, one of a broadband mode and a spatial resolution mode is selected. In a second step 101, a switching unit is set to a specific setting for the mode selected in step 100. In case of spatial resolution mode being selected, received signals and/or signals to be transmitted are routed on a signal path from an antenna array comprising a plurality of N antenna elements to a signal processing unit in a third step 102. Alternatively, if broadband mode has been selected in step 100, received signals and/or signals to be transmitted are routed on a signal path from the antenna array to a combiner/splitter unit to the signal processing unit, in a fourth step 103.

It is important to note that the inventive device and method very closely correspond. Therefore, all of the above said regarding the device is also applicable to the method. Everything which is described in the description and/or claimed in the claims and/or drawn in the drawings can be combined.

The invention is not limited by the examples and especially not by a specific number of signal paths and antenna elements. Also, a limitation to a specific type of combiner/splitter unit is not intended. The invention discussed above can also be applied to a plurality of different communication schemes, such as mobile telephone communication, satellite telephony, etc. The characteristics of the exemplary embodiments can be used in any advantageous combination.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A device for transmitting and/or receiving electromagnetic signals, comprising:
   an antenna array, comprising a plurality of N antenna elements adapted to transmit and/or receive electromagnetic signals;
   a signal combiner/splitter;
   a signal processor comprising at least one analog-to-digital converter and/or digital-to-analog converter for each of the plurality of N antenna elements of the antenna array; and
   a switching component adapted to switch between a broadband mode and a spatial resolution mode; and
   wherein the switching component comprises a first switch and a second switch,
   wherein the first switch is connected to the antenna array by a first plurality of N lines corresponding to the plurality of N antenna elements of the antenna array, to the combiner/splitter by a second plurality of N lines, and to the second switch by a third plurality of N lines,
   wherein the first switch is adapted to switch the antenna array between one of the combiner/splitter and the second switch,
   wherein the second switch is connected to the combiner/splitter by a fourth plurality of N lines, to the first switch by the third plurality of N lines, and to the signal processor by a fifth plurality of N lines, and
   wherein the second switch is adapted to switch the signal processor between one of the combiner/splitter and the first switch.

2. The device according to claim 1, wherein:
   in the broadband mode, the first switch is adapted to connect the antenna array to the signal combiner/splitter, and the second switch is adapted to connect the signal combiner/splitter to the signal processor, and/or
   in the spatial resolution mode, the first switch is adapted to connect the antenna array to the second switch, and the second switch is adapted to connect the first switch to the signal processor.

3. The device according to claim 2, wherein:
   the signal combiner/splitter comprises a plurality of N first ports and a plurality of N second ports; and
   the signal combiner/splitter is adapted to combine input signals at the plurality of N first ports to a single output signal at the plurality of N second ports, and/or to provide a single input signal present at the plurality of N second ports to the plurality of N first ports.

4. The device according to claim 3, wherein:
   the first switch comprises a plurality of N switches;
   the second switch comprises a plurality of N switches;
   the signal processor comprises a plurality of N signal paths;
   each of the plurality of N switches of the first switch is connected to one of the plurality of N antenna elements of the antenna array, one of the plurality of N first ports of the signal combiner/splitter, and one of the plurality of N switches of the second switch; and
   each of the plurality of N switches of the second switch is connected to one of the plurality of N switches of the first switch, one of the plurality of N second ports of the signal combiner/splitter, and one of the plurality of N signal paths of the signal processor.

5. The device according to claim 4, wherein:
in the broadband mode, the plurality of N switches of the first switch are adapted to connect the plurality of N antenna elements of the antenna array to the plurality of N first ports of the signal combiner/splitter, and the plurality of N switches of the second switch are adapted to connect the plurality of N second ports of the signal combiner/splitter to the plurality of N signal paths of the signal processor; and/or
in the spatial resolution mode, the plurality of N switches of the first switch are adapted to connect the plurality of N antenna elements of the antenna array to the plurality of N switches of the second switch, and the plurality of N switches of the second switch are adapted to connect the plurality of N switches of the first switch to the plurality of N signal paths of the signal processor.

6. The device according to claim 4, wherein each of the plurality of N signal paths of the signal processor, (i) when the device is receiving an electromagnetic signal in the broadband mode, is adapted to process a reception of a different frequency slice of the received electromagnetic signal, and (ii) when the device is transmitting an electromagnetic signal in the broadband mode, is adapted to generate a different frequency slice of the electromagnetic signal to be transmitted.

7. The device according to claim 4, wherein each of the plurality of N signal paths of the signal processor (i) when the device is receiving an electromagnetic signal in the spatial resolution mode, is adapted to process a reception of a different antenna element reception signal, and (ii) when the device is transmitting an electromagnetic signal in the spatial resolution mode, is adapted to generate a different antenna element signal to be transmitted.

8. The device according to claim 4, wherein each signal path of the signal processor comprises one or more of a first mixer, a filter, the analog-to-digital converter and/or the digital-to-analog converter for each of the plurality of N antenna elements of the antenna array, an upsampler and/or a downsampler, and a second mixer.

9. The device according to claim 1, wherein:
the device is a transceiver adapted to transmit and receive electromagnetic signals;
the plurality of N antenna elements are adapted to transmit and receive electromagnetic signals;
the signal combiner/splitter is adapted to combine input signals at a plurality of N first ports of the signal combiner/splitter to a single output signal at a plurality of N second ports of the signal combiner/splitter, and to provide a single input signal present at the plurality of N second ports to the plurality of N first ports; and
the signal processor is adapted to generate signals to be transmitted by the antenna array and to receive signals received by the antenna array as electromagnetic signals.

10. The device according to claim 1, wherein:
the device is a receiver adapted to receive electromagnetic signals;
the plurality of N antenna elements are adapted to receive electromagnetic signals;
the signal combiner/splitter is adapted to combine input signals at a plurality of N first ports of the signal combiner/splitter to a single output signal at a plurality of N second ports of the signal combiner/splitter; and
the signal processor is adapted receive signals received by the antenna array as electromagnetic signals.

11. The device according to claim 1, wherein:
the device is a transmitter adapted to transmit electromagnetic signals;
the plurality of N antenna elements are adapted to transmit electromagnetic signals;
the signal combiner/splitter is adapted to provide a single input signal present at a plurality of N second ports of the signal combiner/splitter to a plurality of N first ports of the signal combiner/splitter; and
the signal processor is adapted to generate signals to be transmitted by the antenna array.

12. The device according to claim 1, wherein N is at least 2, or at least 3, or at least 4, or at least 5, or at least 6, or at least 7, or at least 8, or at least 9, or at least 10, or at least 16, or at least 32, or at least 64, or at least 128, or at least 256, or at least 512, or at least 1024.

13. A method for transmitting and/or receiving electromagnetic signals using a device adapted to transmit and/or receive the electromagnetic signals, the method comprising:
selecting, by a switching component of the device, one of a broadband mode and a spatial resolution mode;
switching, by a first switch of the switching component, an antenna array of the device between one of a combiner/splitter of the device and a second switch of the switching component; and
switching, by a second switch of the switching component, a signal processor of the device between one of the combiner/splitter and the first switch; and
wherein the antenna array comprises a plurality of N antenna elements adapted to transmit and/or receive the electromagnetic signals,
wherein the signal processor comprises at least one analog-to-digital converter and/or at least one digital-to-analog converter for each of the plurality of N antenna elements,
wherein the first switch is connected to the antenna array by a first plurality of N lines corresponding to the plurality of N antenna elements, to the combiner/splitter by a second plurality of N lines, and to the second switch by a third plurality of N lines, and
wherein the second switch is connected to the combiner/splitter by a fourth plurality of N lines, to the first switch by the third plurality of N lines, and to the signal processor by a fifth plurality of N lines.

* * * * *